(12) United States Patent
Geislinger et al.

(10) Patent No.: US 9,046,135 B2
(45) Date of Patent: Jun. 2, 2015

(54) TORSIONALLY FLEXIBLE COUPLING

(71) Applicant: Ellergon Antriebstechnik Gesellschaft m.b.H., Hallwang (AT)

(72) Inventors: Matthias Geislinger, Hallwang (AT); Cornelius Geislinger, Hallwang (AT)

(73) Assignee: Ellergon Antriebstechnik Gesellschaft M.B.H., Hallwang (AT)

(*) Notice: Subject to any disclaimer, the term of this patent is extended or adjusted under 35 U.S.C. 154(b) by 0 days.

(21) Appl. No.: 14/063,461

(22) Filed: Oct. 25, 2013

(65) Prior Publication Data
US 2014/0121028 A1 May 1, 2014

(30) Foreign Application Priority Data
Oct. 26, 2012 (DE) .......................... 10 2012 110 289

(51) Int. Cl.
*F16D 3/66* (2006.01)
*F16D 3/64* (2006.01)

(52) U.S. Cl.
CPC ... *F16D 3/64* (2013.01); *F16D 3/66* (2013.01)

(58) Field of Classification Search
CPC .................................... F16D 3/64; F16D 3/66
USPC ..................... 464/82, 84, 100, 101
See application file for complete search history.

(56) References Cited

U.S. PATENT DOCUMENTS

| | | | | |
|---|---|---|---|---|
| 459,325 A | * | 9/1891 | Whitney | 464/84 X |
| 1,595,763 A | * | 8/1926 | Eaton | 464/82 |
| 2,837,902 A | * | 6/1958 | Stevens et al. | 464/101 |
| 3,762,463 A | * | 10/1973 | Sakaki et al. | 464/84 X |
| 4,262,499 A | * | 4/1981 | Pfeifer | 464/82 |

FOREIGN PATENT DOCUMENTS

| | | | |
|---|---|---|---|
| AT | 410829 B | 8/2003 | |
| DE | 1202590 A | 10/1965 | |
| DE | 1222324 A | 8/1966 | |
| DE | 4420895 A1 | 1/1995 | |
| GB | 175429 * | 2/1922 | 464/82 |
| JP | 5059646 | 10/2012 | |

* cited by examiner

*Primary Examiner* — Gregory Binda
(74) *Attorney, Agent, or Firm* — Myers Wolin, LLC

(57) ABSTRACT

A torsionally flexible coupling comprises an inner part having a rotating shaft, an outer part extending around the inner part and arranged coaxially thereto, and spring elements or spring packs arranged between the inner part and the outer part and spaced in circumferential direction, wherein each spring element or spring pack is clamped at a radially outer end in a clamping support on the outer part, and a radially inner end is flexibly engaged with a corresponding groove on the inner part. In position of rest the spring elements or spring packs are angled relative to a radial direction passing through the respective clamping support and are inclined against the main direction of rotation of the coupling. Such an inclined position of the spring elements or spring packs allows a reduction of the portion of damping caused by friction so that damping can become predominantly hydraulic.

13 Claims, 4 Drawing Sheets

TORSIONALLY FLEXIBLE COUPLING

CROSS REFERENCE TO RELATED APPLICATIONS

This application claims priority under 35 USC §119 to German Patent Application No. 10 2012 110 289.9, filed on Oct. 26, 2012, the contents of which are incorporated herein by reference

FIELD OF THE INVENTION

The invention relates to a torsionally flexible coupling comprising an inner part having a rotating shaft, an outer part extending around the inner part and arranged coaxially with it, and a plurality of spring elements or spring packs which are arranged between the inner part and the outer part and are spaced in circumferential direction, wherein each spring element or spring pack is clamped at a radially outer end thereof in a clamping support on the outer part, and at a radial inner end thereof is flexibly engaged with a corresponding groove on the inner part.

BACKGROUND

A torsionally flexible coupling of this type is known, for example, from DE 1 202 590 A1. With such a coupling, it is possible to dampen torsional vibrations that occur during torque transmission. Here, the damping comprises a hydraulic component and a friction component. The hydraulic component results from the forced displacement of the damping medium that is present in the coupling by the spring elements or spring packs that are deformed. Friction effects occur between the spring elements or the spring packs and the relevant grooves on the inner part.

For the damping of torsional vibrations, in some applications, it is desirable to increase the portion of the hydraulic damping as compared to the frictional damping.

Couplings of the type specified in the beginning are mainly used for the transmission of torques in a preferred direction of rotation, also called the main direction of rotation in the following. However, it may sometimes happen that a small torque is also to be transmitted in the opposite direction of rotation.

The object of the present invention is to reduce the friction component of the damping in a torsionally flexible coupling of the type specified above.

SUMMARY

The above object is attained by means of a torsionally flexible coupling comprising:
an inner part having a rotating shaft; an outer part extending around the inner part and arranged coaxially with it; and a plurality of spring elements or spring packs which are arranged between the inner part and the outer part and are spaced in circumferential direction; wherein each spring element or spring pack is clamped at a radially outer end thereof in a clamping support on the outer part; wherein each spring element or spring pack is at a radial inner end thereof flexibly engaged with a corresponding groove on the inner part; and wherein in position of rest of the torsionally flexible coupling the spring elements or spring packs are angled relative to a radial direction passing through the respective clamping support and inclined against the main direction of rotation of the coupling.

It has been seen that such an inclined position of the spring elements or spring packs allows a reduction in the friction component of the damping in a surprisingly simple manner and the damping can thus become predominantly hydraulic.

Through optimization of the angular position of the spring elements or spring packs and the geometry of the grooves on the inner part, an almost linear torsion characteristic of the coupling i.e. the transmitted torque in relation to the torsion angle between the inner part and the outer part can be achieved.

In addition, owing to the reduced friction component, the wear at the grooves as well as at the radial inner ends of the spring elements and spring packs can be significantly reduced. This facilitates a considerable increase in the life of the coupling.

According to an advantageous embodiment of the invention, each groove has, with reference to the relevant spring element or spring pack and in the main direction of rotation of the coupling, a forward groove flank, which forms a curved contact surface for the corresponding spring element or spring pack. During operation, the spring elements or spring packs are supported by the curved contact surface in an articulated manner. Depending on the relative torsion, the radially inner ends of the relevant groove to a greater or lesser extent move out of the position of rest and in doing so, slide along the curved contact surface and roll at least partially. The groove flank on the opposite side does not hinder the movement of the radial inner end of the corresponding spring element. In fact, it is marginally spaced apart from the spring element or spring packs.

Preferably, the curvature of the curved contact surface is such that if there is a relative torsion between the inner part and the outer part, the corresponding spring element or spring pack, owing to its deformation, rolls mostly or completely along the curved contact surface. In the ideal case of exact rolling of the radial inner end of a spring element along the curved contact surface, the frictional effects can be completely avoided. Practically, at least a significant increase in the rolling component between the groove of the inner part and the spring element or spring pack, as well as a reduction in the friction component, is achieved.

According to another advantageous embodiment of the invention, the curvature of the curved contact surface has a constant radius, so that the groove runout is easy to manufacture. Moreover, with regard to minimization of friction effects, the embodiment in the form of an involute is of particular advantage.

Furthermore, according to another advantageous embodiment, the grooves of the inner part are angled to the radial direction and inclined against the main direction of rotation, because of which, with regard to the torque transmission in the opposite direction to the main direction of rotation of the coupling, they can be made particularly narrow. Firstly, this ensures that the flexible bracing at the forward groove flank in the main direction of rotation is not hampered. Secondly, if there is a reversal of the direction of rotation, a noticeable reversal of the spring elements or spring packs in the groove is avoided.

Preferably, the spring elements are angled, with reference to their clamping, at a mathematically positive angle of incidence to a radial ray pointing from the clamping support in the direction of axis of rotation A. In addition, the grooves of the inner part can have a central groove axis that is inclined to the radial direction, so that then, the angle of inclination of the central groove axis to the radial direction is the same as the angle of incidence of the relevant spring element or spring pack.

The spring elements are preferably constructed as leaf springs. If individual springs are used, then in particular, spring elements could be used, which have a tapered wedge-shape from their radial outer end to their radial inner end. Spring packs each comprise at least two or more spring elements in the form of leaf springs, which are stacked on top of one another.

In another advantageous embodiment of the invention, the spring elements or spring packs are made as separate components, which are inserted between the outer part and the inner part. With regard to simple and cost-effective assembly, in such a case, the radial outer ends of neighboring spring elements or spring packs are spaced apart from one another by intermediate pieces. The spring elements or spring packs and the intermediate pieces are biased against each other in circumferential direction in such a way that a radially outer end of a spring element or spring pack is biased against two neighboring intermediate pieces.

In another advantageous embodiment of the invention provides a torsionally flexible coupling, comprising an inner part having a rotating shaft; an outer part extending around the inner part and arranged coaxially with it; and a plurality of spring elements or spring packs which are arranged between the inner part and the outer part and are spaced in circumferential direction; wherein each spring element or spring pack is clamped at a radially outer end thereof in a clamping support on the outer part; wherein each spring element or spring pack is at a radial inner end thereof flexibly engaged with a corresponding groove on the inner part; wherein in position of rest of the torsionally flexible coupling the spring elements or spring packs are angled relative to a radial direction passing through the respective clamping support and inclined against the main direction of rotation of the coupling; wherein the grooves of the inner part are angled relative to the radial direction and are inclined against the main direction of rotation of the coupling; wherein each groove has, with reference to the corresponding relevant spring element or spring pack an in main direction of rotation of the coupling, a forward groove flank, which forms a curved contact surface for the corresponding spring element or spring pack; and wherein the curvature of said curved contact surface has a constant radius or is formed as an involute.

BRIEF DESCRIPTION OF THE DRAWINGS

The invention is explained in further detail below by means of an exemplary embodiment shown in the drawing. The drawing shows in.

DETAILED DESCRIPTION OF THE PREFERRED EMBODIMENTS

Figure 1:
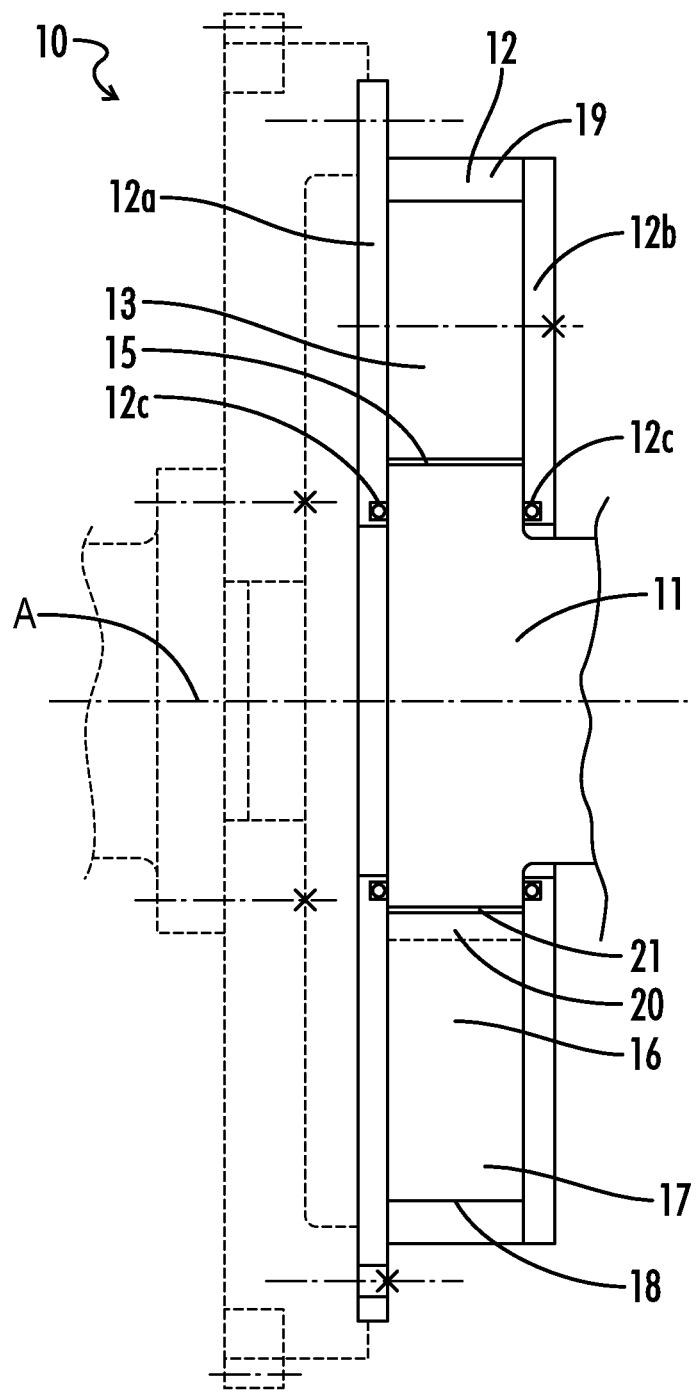
FIG. 1 a schematic longitudinal sectional view of a torsionally flexible coupling according to an exemplary embodiment of the invention, FIG. 2 a sectional view of the coupling according to FIG. 1, FIG. 3 a detailed view of the bracing of a spring element or spring pack on a forward groove flank in the main direction of rotation of the coupling at the position of rest of the coupling, and in FIG. 4 a detailed view of the bracing of a spring element or spring pack on a forward groove flank in the main direction of rotation of the coupling with a relative torsional angle $\Delta\phi$ between the inner part and outer part of the coupling.

The exemplary embodiment shows a torsionally flexible coupling 10 for torque transmission. Coupling 10 comprises an inner part 11 with an axis of rotation A, which can be connected to a first rotating component. Moreover, the coupling 10 has an outer part 12, extending radially around the inner part 11, and arranged coaxially with it. Outer part 12 can be connected to another rotating component with a first flange 12a and is closed by a second axially opposite flange 12b.

An annular space is formed between inner part 11 and outer part 12, which is divided by a plurality of intermediate pieces 13 into a plurality of consecutive chambers 14 arranged in circumferential direction. In this arrangement, the flanges of the outer part 12 seal the inner part 11 with sealing rings 12c.

The annular space or the chambers 14 are filled with a hydraulic damping medium, for example, pressurized oil. Moreover, the chambers 14 are connected to one another through streaming channels 15. The streaming channels 15 are preferably formed by gaps between the intermediate pieces 13 and the cylindrical outer periphery of the inner part 11. By forcing the damping medium into the chambers 14 through the gap-shaped streaming channels 15, a damping effect for damping torsional rotations is achieved.

Furthermore, coupling 10 comprises a large number of spring elements 16, which are arranged in circumferential direction, distributed between the inner part 11 and the outer part 12 and which couple the inner part 11 and the outer part 12 to one another in a torsionally flexible manner. The spring elements 16 are arranged in the chambers 14 and partition them. When there is a relative torsion between the inner part 11 and the outer part 12 owing to a torsional vibration, the spring elements 16 get deformed, so that the chamber volume in the direction of rotation before and after the respective spring element 16 is reduced or enlarged respectively. The dynamic volume equalization takes place, as has already been mentioned, through the streaming channels 15. A static load does, of course, also result in deformation of the spring elements 16, but does not result in a damping effect.

Each spring element 16 is clamped at a radial outer end 17 in a clamping support 18 provided on the outer part 12. By means of the clamping support 18, the bending moments occurring during the operation of the coupling at the spring element 16 are supported against the outer part 12.

Fixed clamping of the radially outer ends 17 of the spring elements 16 is preferably achieved by means of the intermediate pieces 13 and a clamping ring 19 of the outer part 12 that radially encloses them. To that end, the spring elements 16 and intermediate pieces 13 are placed alternately in the outer part 12 and fastened in position by pressing or shrinking the clamping ring 19. In the exemplary embodiment shown, accordingly, neighboring spring elements 16 are spaced from one another by an intermediate piece 13. Because of the joint clamping in circumferential direction each radially outer end 17 of each spring element 16 is thus clamped by two neighboring intermediate pieces 13, respectively.

Furthermore, each spring element 16 extends at one radially inner end 20 into a corresponding groove 21 on the inner part 11 in an articulated manner. The grooves 21 extend in parallel to the rotational axis A. In contrast to the clamping of the radially outer ends 17 on the outer part 12, the radial inner ends 20 of the spring elements 16 are received in a movable manner. In particular, the radial inner ends 20 can move further out of the grooves 21 as compared to the position of rest of the coupling 10 depicted in FIG. 2. The support in the grooves 21 is in the manner of an articulated joint, so that the bending moment in the corresponding spring element 16 is zero at the point of support in the groove 21, if any frictional effects are ignored.

Figure 2:
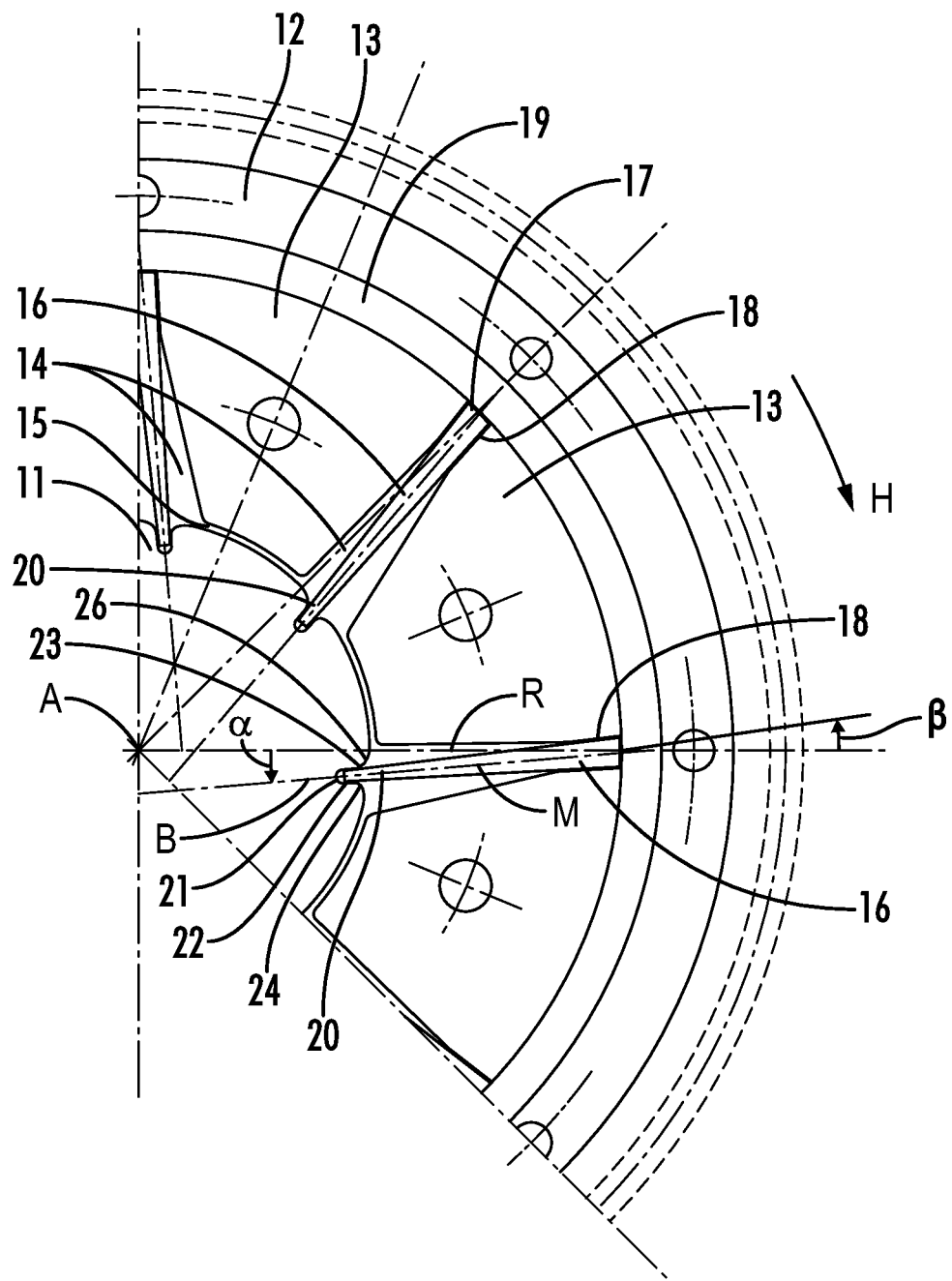
Figure 3:
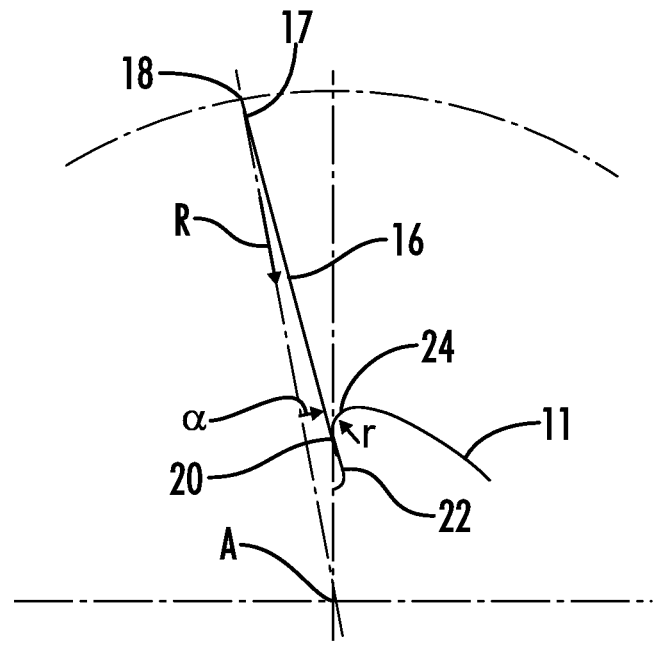

The groove geometry is selected such that in the main direction of rotation, which is indicated in FIG. 2 by an arrow H, the spring element 16 is only in contact with groove flank 22, which is arranged forwards in the main direction of rotation, and as against that, is spaced apart from the rearward groove flank 23 by a small gap. During transmission of a torque in the main direction of rotation H, the radially inner end 20 of the spring element 16 is pulled out somewhat from the groove 21, as has been shown particularly in FIG. 4, albeit overproportionately for the purpose of clarity. The line of contact of the spring element 16 then moves along the edge of the groove. For this purpose, the groove edge is constructed as a curved contact surface 24. Depending on the geometry of groove 21 and spring element 16, certain sliding and rolling effects can occur here. The sliding components, like the streaming of damping medium through the streaming channels 15, also create a damping effect. This results from its causative friction.

The invention envisages reducing this frictional component of the damping.

Therefore, in the coupling 10 shown in the figure, the spring elements 16 are not aligned radially, as is usually the case, but are inclined to the radial direction. In particular, the spring elements 16 in the position of rest of the torsionally flexible coupling 10, are angled to the radial direction through the respective clamping support 18 opposite to the main direction of rotation of the coupling 10. In other words, the spring elements 16, with respect to their clamping support 18 are each inclined, with a mathematically positive angle of incidence $\alpha$, i.e. an angle of incidence $\alpha$ greater than 0°, to a radial ray R pointing from the clamping support 18 in the direction of the axis of rotation A. Particularly suitable values of angle of incidence $\alpha$ are in the range from 1.5° to 12°, preferably in the range from 2° to 8°. The radially inner end 21 of the respective spring element therefore somewhat precedes the radial outer end 17 in the main direction of rotation H.

The grooves 21 of the inner part 11 are also angled to the radial direction, with the inclination being opposite to the main direction of rotation of the coupling 10. In the exemplary embodiment shown, the grooves 21 of the inner part 11 each have a groove center axis B that is inclined to the radial direction, with the inclination angle $\beta$ of the groove center axis B to the radial direction preferably equaling the angle of incidence $\alpha$ of the relevant spring element 16. However, minor deviations of up to 2° are also possible.

As can be seen from FIG. 2, the central axis M of the spring element 16 and the groove central axis B in the position of rest of the coupling can coincide.

Figure 4:
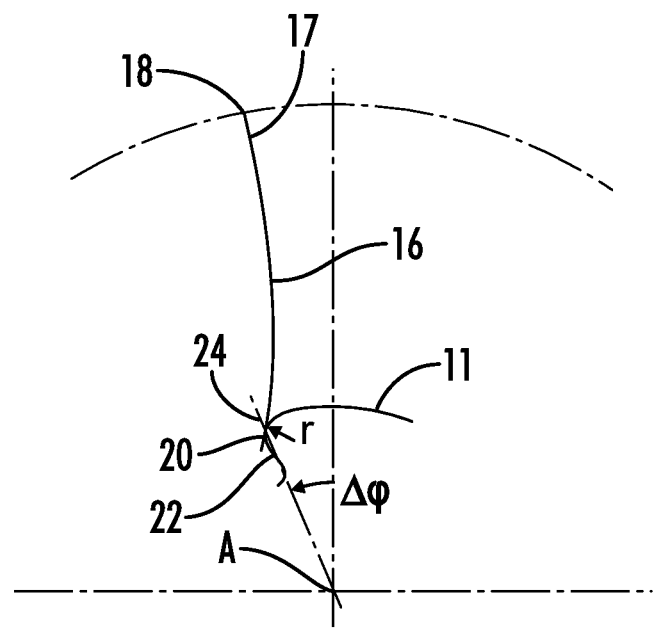

During operation, i.e. when there is an existing torque, the spring elements 16 get deformed as a consequence of a relative torsion $\Delta\phi$ between the inner part 11 and the outer part 12, as has been shown as an example in FIG. 4. During this, the line of contact of the radial inner end 20 of the respective spring element 16 moves along the curved contact surface 24.

The curvature of the curved contact surface 24 has been selected such that the respective spring element 16, owing to its deformation, rolls mostly or completely along the curved contact surface, as a result of which the friction between the spring element 16 and the groove 21 is reduced. The curvature of the curved contact surface 24 can have a constant radius r. It is, however, also possible to provide a radius of curvature that increases outwards towards the groove. Moreover, the curved contact surface 24 can also be designed as an involute.

The curved contact surface 24 can have a different geometry in the direction of rotation H, from that of the opposite curved contact surface 26 for the load against the direction of rotation H, which is located on the rearward groove flank 23.

Figure 5:
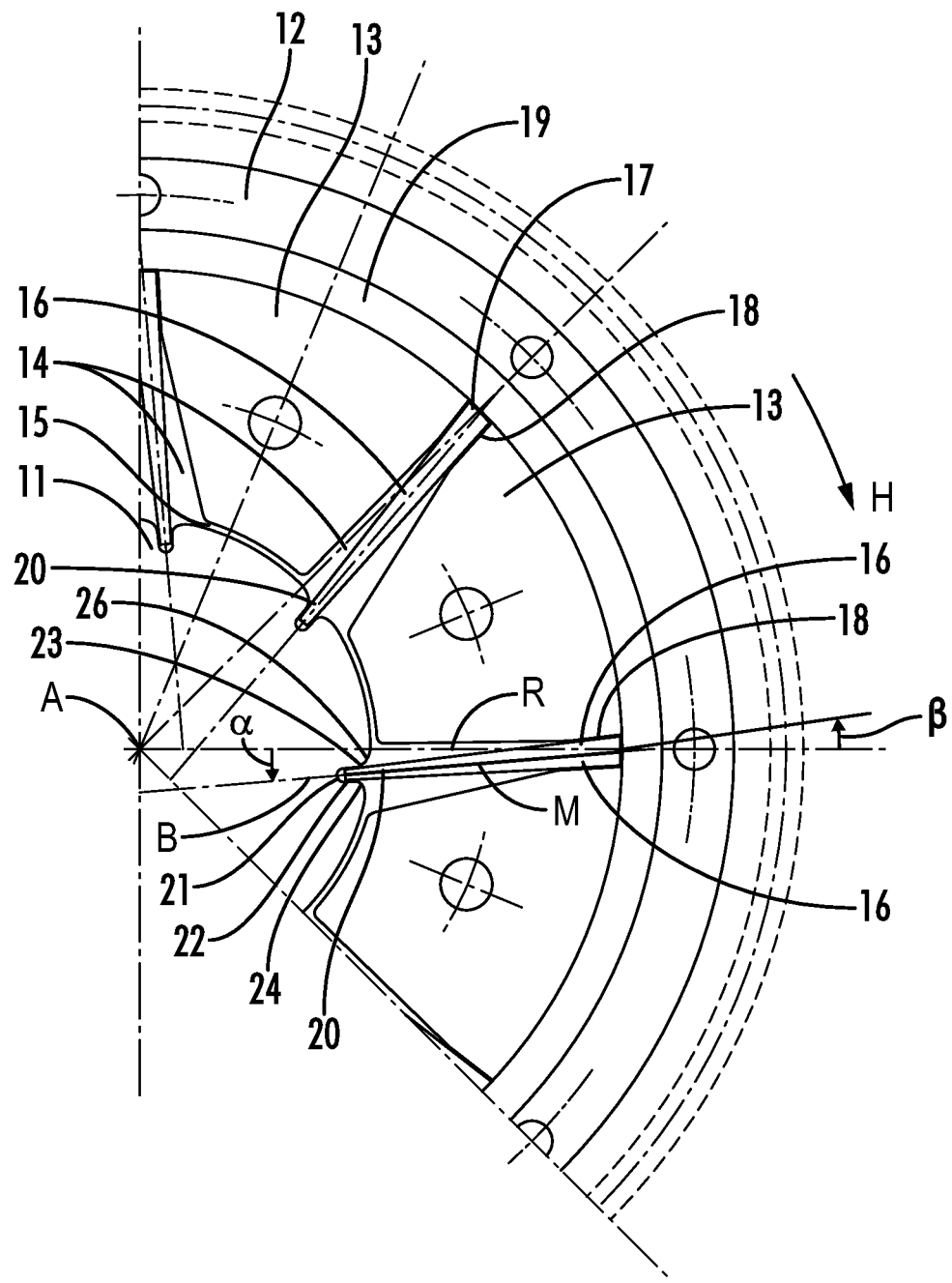
FIG. 5 shows a sectional view of an alternate embodiments of a coupling of the invention.

The spring elements 16 in this case are constructed as individual leaf springs of spring steel or the like, which can also taper in a wedge shape from their radial outer end 17 to their radial inner end 20. Instead of the spring elements 16 as shown, spring packs can also be provided, which each have two or more leaf springs in stacked arrangement. Such an arrangement, combining multiple spring elements 16 into spring packs, is shown in FIG. 5.

With the configuration of the coupling 10 explained above, an increase of the rolling component between the spring elements 16 and the grooves 21 of the inner part 11 and a reduction of the friction component is achieved. As a result, referred to the total damping, the proportion of the hydraulic damping in comparison to the frictional damping increases.

Through optimization of the angular position of the spring elements and the groove geometry of the grooves on the inner part, an almost linear torsion characteristic of the coupling (the transmitted torque in relation to the torsion angle) can be additionally achieved.

The lower friction between the spring elements 16 and the grooves 21 results in less wear and as a result, allows a longer life.

Thanks to the inclined position of the spring elements 16, a different torsional characteristic can be achieved in the main direction of rotation H of the coupling from that in the opposite direction.

The invention has been described in further detail above with the help of an exemplary embodiment and other variants. However, it is not limited to the description above, but covers all the embodiments defined by the patent claims. In particular, the individual technical features above can also be combined with one another, even if this is not expressly so described, as long as it is technically feasible.

What is claimed is:

1. A torsionally flexible coupling, comprising:
   an inner part having a rotating shaft;
   an outer part extending around the inner part and arranged coaxially with it; and
   a plurality of spring elements which are arranged between the inner part and the outer part and are spaced in circumferential direction;
   wherein each spring element is clamped at a radially outer end thereof in a clamping support on the outer part;
   wherein each spring element is at a radial inner end thereof flexibly engaged with a corresponding groove on the inner part; and
   wherein in position of rest of the torsionally flexible coupling the spring elements are each angled relative to a radial direction passing through the respective clamping support and inclined against the main direction of rotation of the coupling so as to provide a different torsion characteristic in the main direction of rotation and in the opposite direction.

2. The torsionally flexible coupling of claim 1, wherein each groove has, with reference to the corresponding relevant spring element in the main direction of rotation of the coupling, a forward groove flank, which forms a curved contact surface for the corresponding spring element.

3. The torsionally flexible coupling of claim 2, wherein the curvature of the curved contact surface is such that if there is a relative torsion between the inner part and the outer part, the corresponding spring element, owing to its deformation, rolls mostly or completely along the curved contact surface.

4. The torsionally flexible coupling of claim 2, wherein the groove further comprises a rearward groove flank opposite to the forward groove flank and forming a curved contact surface for the corresponding spring element, wherein the curved contact surface of the forward groove flank has a curvature which is different to that of the curved contact surface of the rearward groove flank.

5. The torsionally flexible coupling of claim 1, wherein the grooves of the inner part are angled relative to the radial direction and are inclined against the main direction of rotation of the coupling.

6. The torsionally flexible coupling of claim 1, wherein the spring elements, with respect to their clamping support are each inclined, with a mathematically positive angle of incidence α, to a radial ray R pointing from the clamping support to the axis of rotation A and wherein the grooves of the inner part each have a groove centre axis B that is inclined to the radial direction, wherein the inclination angle β of the groove centre axis B to the radial direction is equal to the angle of incidence α of the corresponding spring element.

7. The torsionally flexible coupling of claim 1, wherein the spring elements taper in wedge form from their radially outer end to their radially inner end.

8. The torsionally flexible coupling of claim 1, wherein the radially outer ends of neighbouring spring elements are spaced from one another by intermediate pieces and the spring elements and the intermediate pieces are biased against each other in the circumferential direction in such way that a radially outer end of a spring element is biased against two neighbouring intermediate pieces.

9. The torsionally flexible coupling of claim 1, further comprising spring packs including said spring elements, respectively.

10. A torsionally flexible coupling, comprising:
an inner part having a rotating shaft;
an outer part extending around the inner part and arranged coaxially with it; and
a plurality of spring elements or spring packs, including two or more spring elements, which are arranged between the inner part and the outer part and are spaced in circumferential direction;
wherein each spring element or spring pack is clamped at a radially outer end thereof in a clamping support on the outer part;
wherein each spring element or spring pack is at a radial inner end thereof flexibly engaged with a corresponding groove on the inner part;
wherein in position of rest of the torsionally flexible coupling all spring elements or spring packs are angled relative to a radial direction passing through the respective clamping support and inclined against the main direction of rotation of the coupling so as to provide a different torsion characteristic in the main direction of rotation and in the opposite direction;
wherein the grooves of the inner part are angled relative to the radial direction and are inclined against the main direction of rotation of the coupling; and
wherein each groove has, with reference to the corresponding relevant spring element or spring pack an in main direction of rotation of the coupling, a forward groove flank and a rearward groove flank opposite said forward groove flank, which form curved contact surfaces for the corresponding spring element or spring pack, wherein the curved contact surface of the forward groove flank has a curvature which is different to that of the curved contact surface of the rearward groove flank.

11. The torsionally flexible coupling of claim 10, wherein the spring elements, with respect to their clamping support are each inclined, with a mathematically positive angle of incidence α, to a radial ray pointing from the clamping support to the axis of rotation A and wherein the grooves of the inner part each have a groove centre axis that is inclined to the radial direction, wherein the inclination angle β of the groove centre axis to the radial direction is equal to the angle of incidence α of the corresponding spring element or spring pack.

12. The torsionally flexible coupling of claim 10, wherein the spring elements taper in wedge form from their radially outer end to their radially inner end.

13. The torsionally flexible coupling of claim 10, wherein the radially outer ends of neighbouring spring elements or spring packs are spaced from one another by intermediate pieces and the spring elements or spring packs and the intermediate pieces are biased against each other in the circumferential direction in such way that a radially outer end of a spring element or spring pack is biased against two neighbouring intermediate pieces.

* * * * *